US010639798B2

(12) United States Patent
Pryor et al.

(10) Patent No.: US 10,639,798 B2
(45) Date of Patent: May 5, 2020

(54) GRIPPER ACTUATING SYSTEM IN A FOOD PROCESSING MACHINE

(71) Applicant: Provisur Technologies, Inc., Chicago, IL (US)

(72) Inventors: Glen F. Pryor, Manhattan, IL (US); Fernando Garcia-Perez, Park Ridge, IL (US)

(73) Assignee: PROVISUR TECHNOLOGIES, INC., Chicago, IL (US)

(*) Notice: Subject to any disclaimer, the term of this patent is extended or adjusted under 35 U.S.C. 154(b) by 225 days.

(21) Appl. No.: 15/398,660

(22) Filed: Jan. 4, 2017

(65) Prior Publication Data
US 2018/0186011 A1    Jul. 5, 2018

(51) Int. Cl.
*B25J 11/00* (2006.01)
*B25J 15/02* (2006.01)
(Continued)

(52) U.S. Cl.
CPC ....... *B25J 11/0045* (2013.01); *B25J 15/0213* (2013.01); *B26D 5/00* (2013.01);
(Continued)

(58) Field of Classification Search
CPC ........ B26D 7/30; B26D 7/32; B26D 2210/02; B26D 7/0625; B26D 7/0608; B26D 5/00; B26D 5/34; B26D 2007/011; B26D 7/0683; B26D 7/00; B26D 1/143; B26D 7/06; B26D 7/18; B26D 2210/08; B26D 5/32; B26D 5/08; B26D 5/42; B26D 7/01; B26D 7/088; B26D 7/22; B26D 7/225;
(Continued)

(56) References Cited

U.S. PATENT DOCUMENTS 3,846,957 A    11/1974  Divan
3,848,491 A    11/1974  Flesch
(Continued)

FOREIGN PATENT DOCUMENTS

DE    8129776.9    * 12/1981  ............... B26D 7/28
EP    0713753 A2    5/1996

OTHER PUBLICATIONS

Notification of Transmittal of the International Search Report and the Written Opinion of the International Searching Authority, or the Declaration, for PCT/US17/63335, dated Feb. 1, 2018, 9 pages.

*Primary Examiner* — Ryan Rink
(74) *Attorney, Agent, or Firm* — Klintworth & Rozenblat IP LLP

(57) ABSTRACT

A gripping system of a food processing machine includes a gripping device, an airflow sensing device, at least one processor, and at least one memory. The gripping device is moveable between an open configuration and a closed configuration. The airflow sensing device is configured to sense an airflow. The at least one processor is in electronic communication with the airflow sensing device. The at least one memory is in electronic communication with the at least one processor. The at least one memory comprises programming code for execution by the at least one processor. The programming code is configured to move the gripping device from the open configuration to the closed configuration when the airflow sensing device senses a change in the airflow.

23 Claims, 12 Drawing Sheets

(51) Int. Cl.
*B26D 5/00* (2006.01)
*B26D 7/01* (2006.01)

(52) U.S. Cl.
CPC .......... *B26D 7/01* (2013.01); *B26D 2007/011* (2013.01); *B26D 2210/02* (2013.01)

(58) Field of Classification Search
CPC . B26D 7/24; B26D 5/20; B26D 5/007; B26D 7/325; B26D 1/14; B26D 1/16; B26D 7/018; B26D 7/02; B26D 1/30; B26D 7/0641; B26D 1/0006; B26D 1/03; B26D 1/29; B26D 1/553; B26D 3/161; B26D 3/166; B26D 3/18; B26D 5/086; B26D 7/0006; B26D 7/0616; B26D 7/0633; B26D 7/08; B26D 7/12; B26D 7/2628; B26D 7/2635; B26D 7/27; B26D 9/00; A22C 17/0093; A22C 17/0033; B65B 25/065

See application file for complete search history.

(56) References Cited

U.S. PATENT DOCUMENTS

| | | | |
|---|---|---|---|
| 4,356,205 A | 10/1982 | Richards | |
| 4,428,263 A | 1/1984 | Lindee et al. | |
| 4,712,458 A * | 12/1987 | Mally | B26D 7/32 83/354 |
| 4,745,681 A | 5/1988 | Hollis, Jr. et al. | |
| 4,763,738 A | 8/1988 | Kuchler | |
| 5,065,656 A | 11/1991 | Flisram | |
| 5,117,717 A | 6/1992 | Mally | |
| 5,129,298 A | 7/1992 | Cresson et al. | |
| 5,164,777 A | 11/1992 | Agarwal | |
| 5,271,340 A | 12/1993 | Whitney | |
| 5,481,466 A | 1/1996 | Carey | |
| 5,564,554 A | 10/1996 | Lawrence | |
| 5,628,237 A | 5/1997 | Lindee et al. | |
| 5,724,874 A | 3/1998 | Lindee et al. | |
| 5,787,776 A | 8/1998 | Nishimoto | |
| 5,787,801 A | 8/1998 | Kirk et al. | |
| 5,875,697 A | 3/1999 | Cole et al. | |
| 5,974,925 A | 11/1999 | Lindee et al. | |
| 5,988,033 A | 11/1999 | Skaar et al. | |
| 6,164,174 A | 12/2000 | Sigurdsson et al. | |
| 6,354,644 B1 * | 3/2002 | Zaguroli, Jr. | B65H 19/123 294/67.22 |
| 6,484,615 B2 | 11/2002 | Lindee | |
| 6,585,580 B1 | 7/2003 | Hergott | |
| 6,591,723 B1 | 7/2003 | Jung | |
| 6,763,750 B2 | 7/2004 | Lindee | |
| 6,883,409 B1 | 4/2005 | Spix et al. | |
| 7,073,419 B2 | 7/2006 | Weber | |
| 7,089,840 B2 | 8/2006 | Freudinger et al. | |
| 7,270,039 B2 | 9/2007 | Lindee | |
| 7,278,344 B2 | 10/2007 | Pryor | |
| 7,299,728 B2 | 11/2007 | Ferrin et al. | |
| 7,306,444 B2 | 12/2007 | Heinzen et al. | |
| 7,377,201 B2 | 5/2008 | Chen | |
| 7,600,459 B2 | 10/2009 | Bodey et al. | |
| 7,603,936 B2 | 10/2009 | Pryor et al. | |
| 8,091,458 B2 | 1/2012 | Culling | |
| 8,109,186 B2 | 2/2012 | Culling | |
| 8,250,955 B2 | 8/2012 | Sandberg et al. | |
| 8,336,434 B2 | 12/2012 | Sandberg et al. | |
| 8,408,108 B2 | 4/2013 | Redemann et al. | |
| 8,408,109 B2 | 4/2013 | Lindee et al. | |
| 8,473,094 B2 | 6/2013 | Becker et al. | |
| 8,596,175 B2 | 12/2013 | Weber | |
| 8,616,099 B2 | 12/2013 | Hallvardsson et al. | |
| 8,777,284 B2 | 7/2014 | Schaller et al. | |
| 8,812,146 B2 | 8/2014 | Einarsson et al. | |
| 8,850,938 B2 | 10/2014 | Lindee et al. | |
| 8,869,664 B2 | 10/2014 | Eyles et al. | |
| 8,978,529 B2 | 3/2015 | Pasek | |
| 9,062,689 B2 | 6/2015 | Schaaf | |
| 9,095,144 B1 | 8/2015 | Sekerak et al. | |
| 9,173,431 B2 | 11/2015 | Kodali | |
| 9,272,428 B2 | 3/2016 | Müller et al. | |
| 9,296,120 B2 | 3/2016 | McLaughlin et al. | |
| 9,375,859 B2 | 6/2016 | Weber | |
| 9,381,660 B2 | 7/2016 | Schaub | |
| 9,399,531 B2 | 7/2016 | Pryor et al. | |
| 9,457,487 B2 | 10/2016 | Mayer | |
| 2002/0098791 A1 | 7/2002 | Handel et al. | |
| 2004/0035276 A1 | 2/2004 | Weber | |
| 2005/0132864 A1 | 6/2005 | Biggs et al. | |
| 2005/0152795 A1 * | 7/2005 | Friel, Sr. | B26D 7/08 417/423.8 |
| 2006/0219069 A1 | 10/2006 | Skaar et al. | |
| 2008/0000337 A1 | 1/2008 | Dickover et al. | |
| 2008/0016999 A1 | 1/2008 | Mathues et al. | |
| 2008/0196566 A1 | 8/2008 | Culling | |
| 2008/0196603 A1 | 8/2008 | Culling | |
| 2009/0120256 A1 * | 5/2009 | Pasek | B26D 7/18 83/446 |
| 2009/0188357 A1 | 7/2009 | Lindee et al. | |
| 2010/0288093 A1 | 11/2010 | Seager et al. | |
| 2010/0307303 A1 | 12/2010 | Weber | |
| 2010/0307304 A1 | 12/2010 | Weber | |
| 2011/0126680 A1 | 6/2011 | Weber | |
| 2011/0247466 A1 | 10/2011 | Weber | |
| 2011/0265621 A1 | 11/2011 | Schmidt | |
| 2011/0265624 A1 | 11/2011 | Pasek et al. | |
| 2012/0060659 A1 | 3/2012 | Weber | |
| 2012/0073415 A1 | 3/2012 | Maidel et al. | |
| 2012/0085216 A1 | 4/2012 | Lobbia et al. | |
| 2012/0086226 A1 | 4/2012 | Weber | |
| 2012/0212603 A1 | 8/2012 | Lindee et al. | |
| 2012/0312135 A1 * | 12/2012 | Schaub | B26D 7/0608 83/13 |
| 2013/0019722 A1 | 1/2013 | Eyles et al. | |
| 2013/0104709 A1 | 5/2013 | Rother | |
| 2013/0108409 A1 | 5/2013 | Wu et al. | |
| 2013/0139665 A1 | 6/2013 | Sperry et al. | |
| 2014/0144303 A1 * | 5/2014 | Muller | B26D 7/018 83/100 |
| 2014/0208917 A1 | 7/2014 | Whitney | |
| 2014/0262669 A1 | 9/2014 | Conti et al. | |
| 2014/0338509 A1 | 11/2014 | Lindee et al. | |
| 2014/0352505 A1 | 12/2014 | Grasselli | |
| 2015/0013516 A1 | 1/2015 | Bifulco | |
| 2015/0122095 A1 | 5/2015 | Schmeiser | |
| 2015/0135921 A1 | 5/2015 | Martinez-Montes | |
| 2015/0202786 A1 | 7/2015 | Mayer et al. | |
| 2016/0144527 A1 | 5/2016 | Achenbach et al. | |
| 2016/0243662 A1 * | 8/2016 | Suzuki | B23Q 17/006 |
| 2016/0271822 A1 | 9/2016 | Burk et al. | |

* cited by examiner

GRIPPER ACTUATING SYSTEM IN A FOOD PROCESSING MACHINE

FIELD OF THE DISCLOSURE

This disclosure relates to actuating systems to actuate gripping devices in food processing machines.

BACKGROUND

Gripping systems of food processing machines sometimes use air pressure sensors to determine when the gripping device is in contact with the food product. However, these sensors can be unreliable as many unrelated factors can affect the air pressure. This can lead to increased cost due to undue maintenance and down-time. Additionally, food processing machines sometimes vent air from the gripping devices to the ambient environment surrounding the food product. This can lead to contamination of the food product.

A gripping system of a food processing machine, and method of its use, is needed to overcome one or more of the issues associated with one or more of the existing gripping systems for determining when the gripping device is in contact with a food product.

SUMMARY

In one embodiment, a gripping system of a food processing machine includes a gripping device, an airflow sensing device, at least one processor, and at least one memory. The gripping device is moveable between an open configuration and a closed configuration. The airflow sensing device is configured to sense an airflow. The at least one processor is in electronic communication with the airflow sensing device. The at least one memory is in electronic communication with the at least one processor. The at least one memory comprises programming code for execution by the at least one processor. The programming code is configured to move the gripping device from the open configuration to the closed configuration when the airflow sensing device senses a change in the airflow.

In another embodiment, a gripping system of a food processing machine includes a gripping device, a compartment, a piston, a pump, and a plurality of lines. The gripping device is moveable between an open configuration and a closed configuration. The piston is disposed within the compartment for moving the gripping device between the open configuration and the closed configuration. At least two of the plurality of lines connect the pump to the compartment, and at least one of the plurality of lines vents the compartment to an ambient environment at a location which is at least five feet away from the gripping device.

In another embodiment, a method of operating a gripping device of a food processing machine is disclosed. In one step, a change in airflow is sensed with an airflow sensing device. In another step, the gripping device is automatically moved between an open and a closed configuration when a change in the airflow is sensed by the airflow sensing device.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
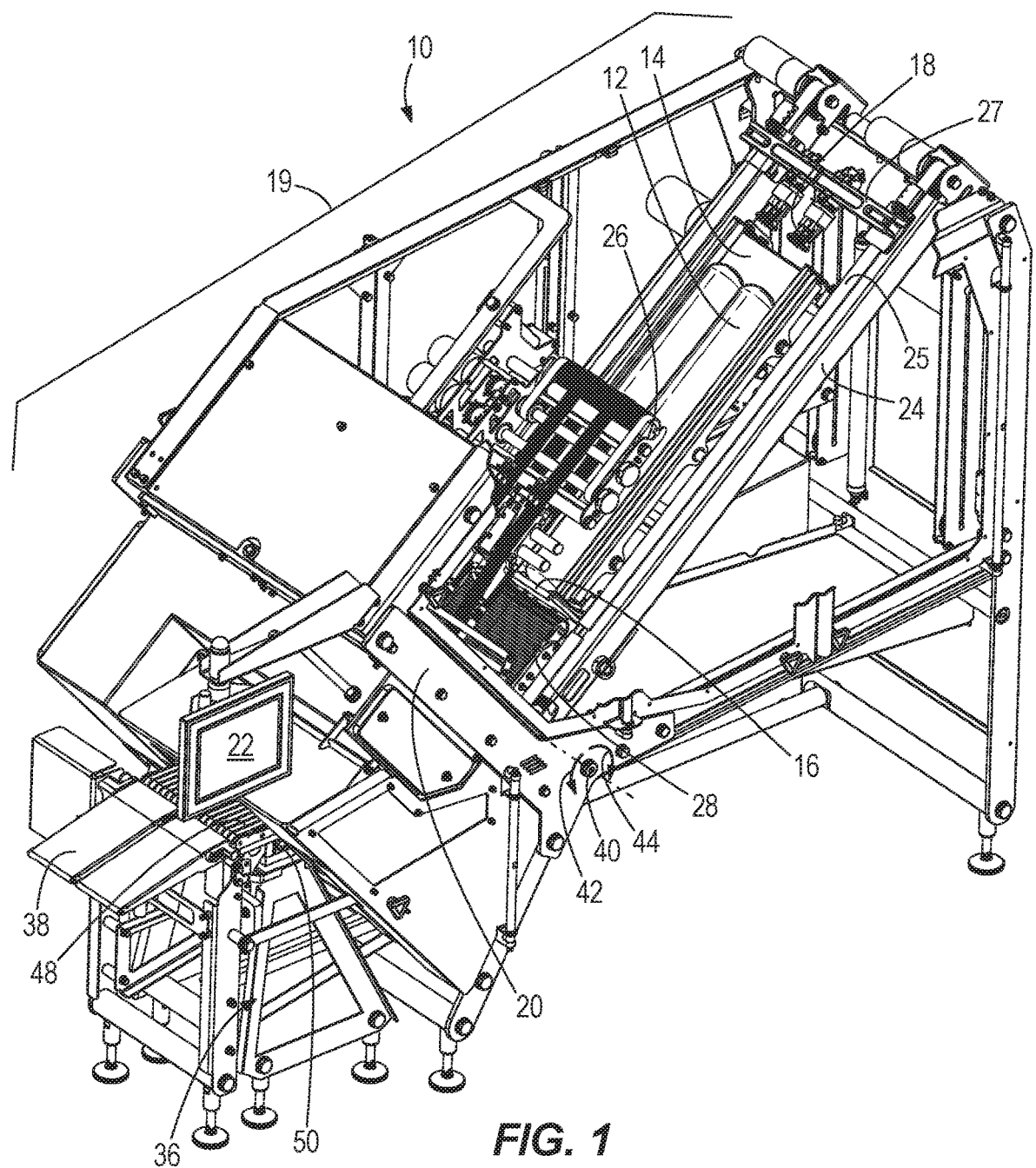
FIG. 1 illustrates a side perspective view of one embodiment of a food processing machine with a food product disposed in a product tray in a raised position, held in place by a gate, with a gripping device disposed apart from the food product.
Figure 2:
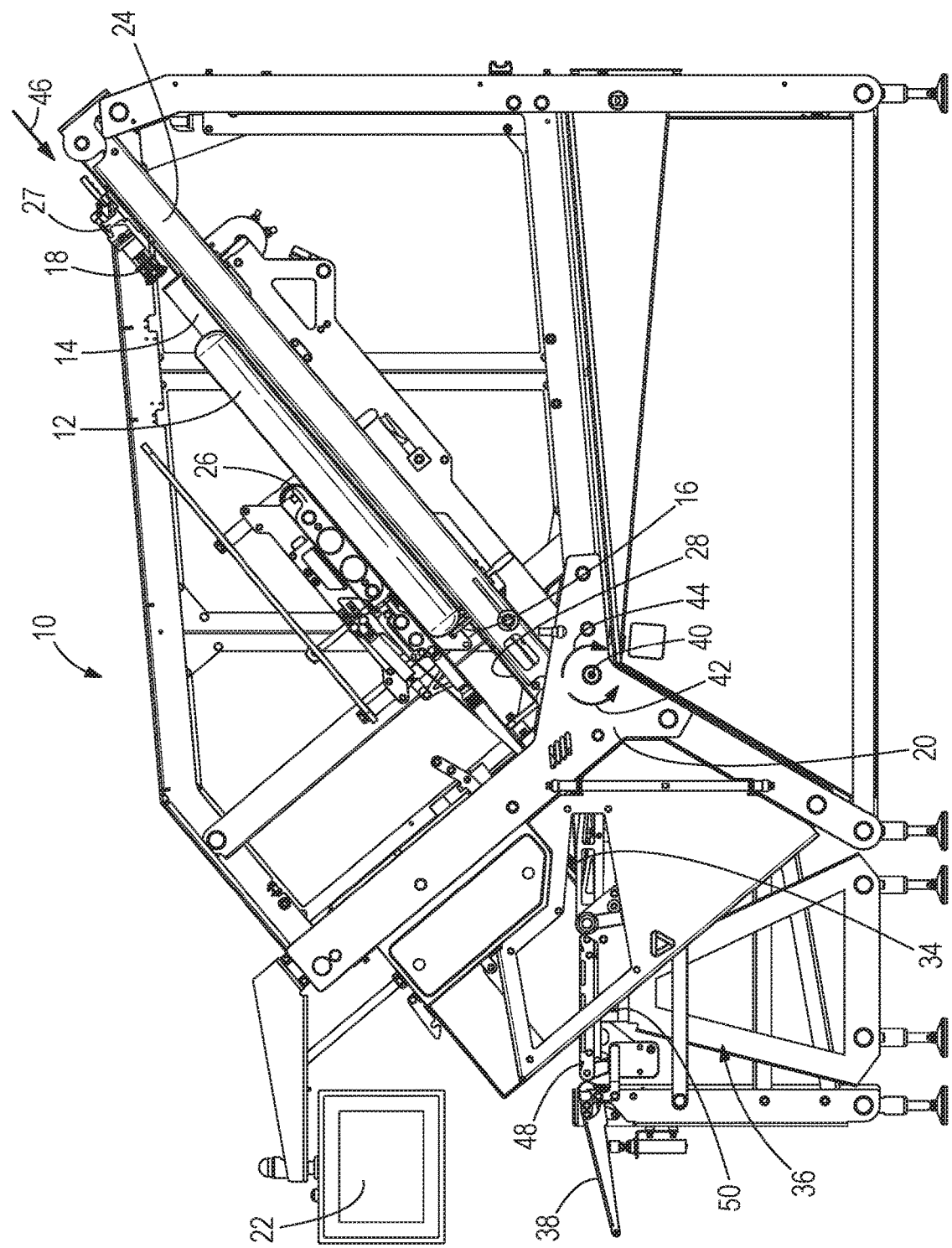
FIG. 2 illustrates a side view of the food processing machine of the embodiment of FIG. 1 with the food product disposed in the product tray in the raised position, held in place by the gate, with the gripping device disposed apart from the food product.
Figure 3:
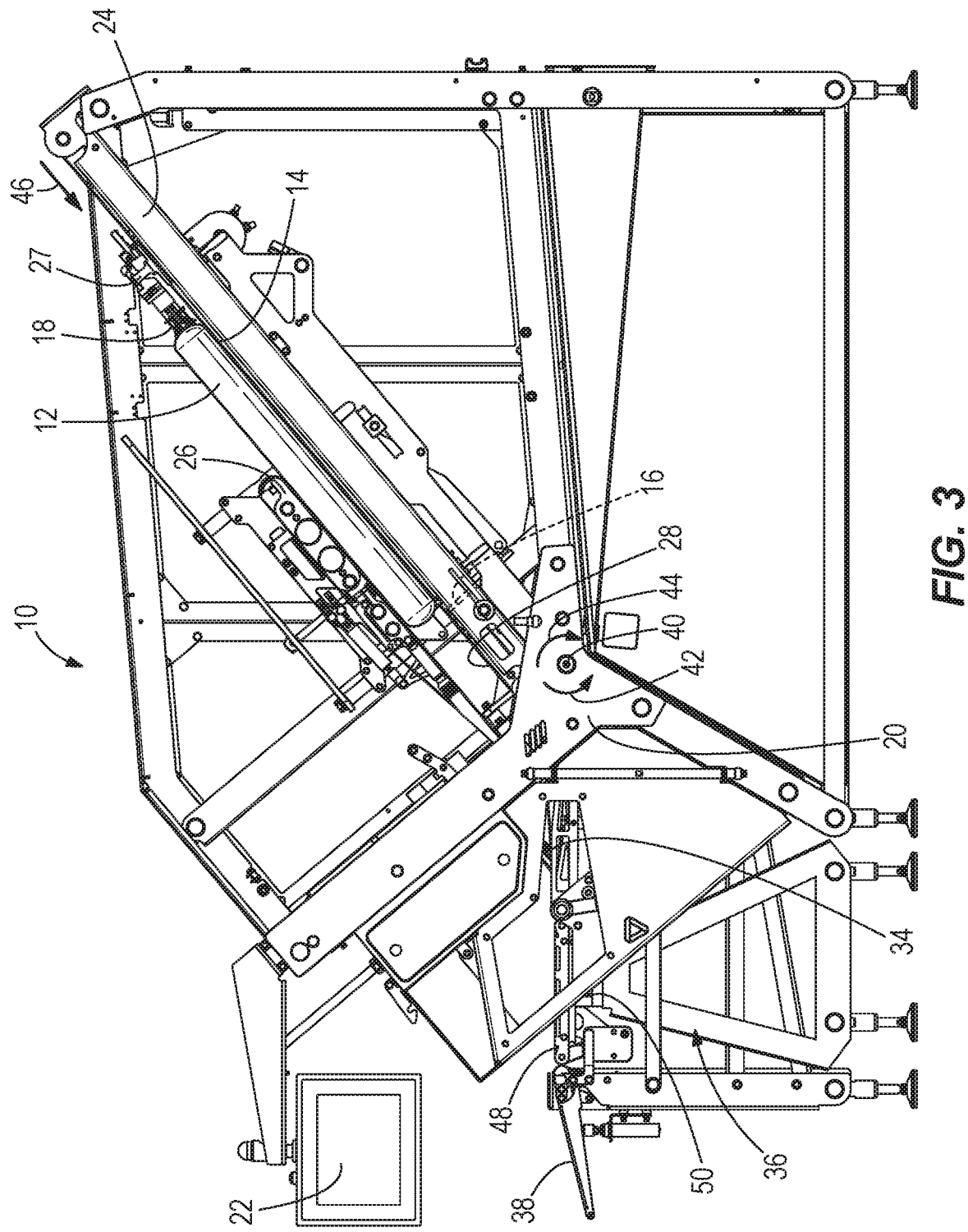
FIG. 3 illustrates a side view of the food processing machine of the embodiment of FIG. 1 with the food product disposed in the product tray in the raised position, with the gate having been lowered away from the food product, with the gripping device disposed against an end of the food product holding the food product in place.
Figure 4:
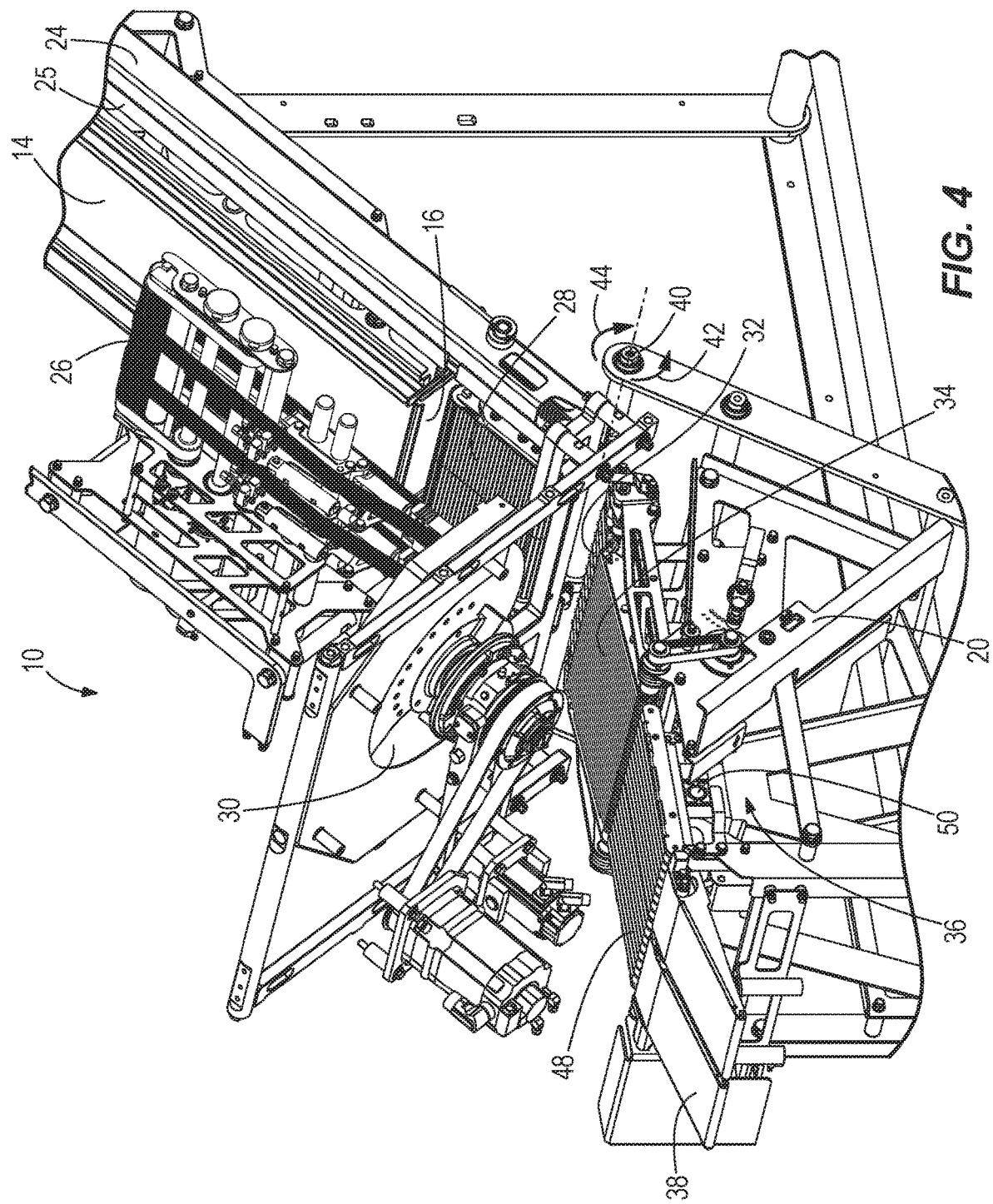
FIG. 4 illustrates a partial side perspective view of the food processing machine of the embodiment of FIG. 1 with a portion of a frame of the food processing machine of FIG. 1 removed and the food product removed to assist in viewing internal components.
Figure 5:
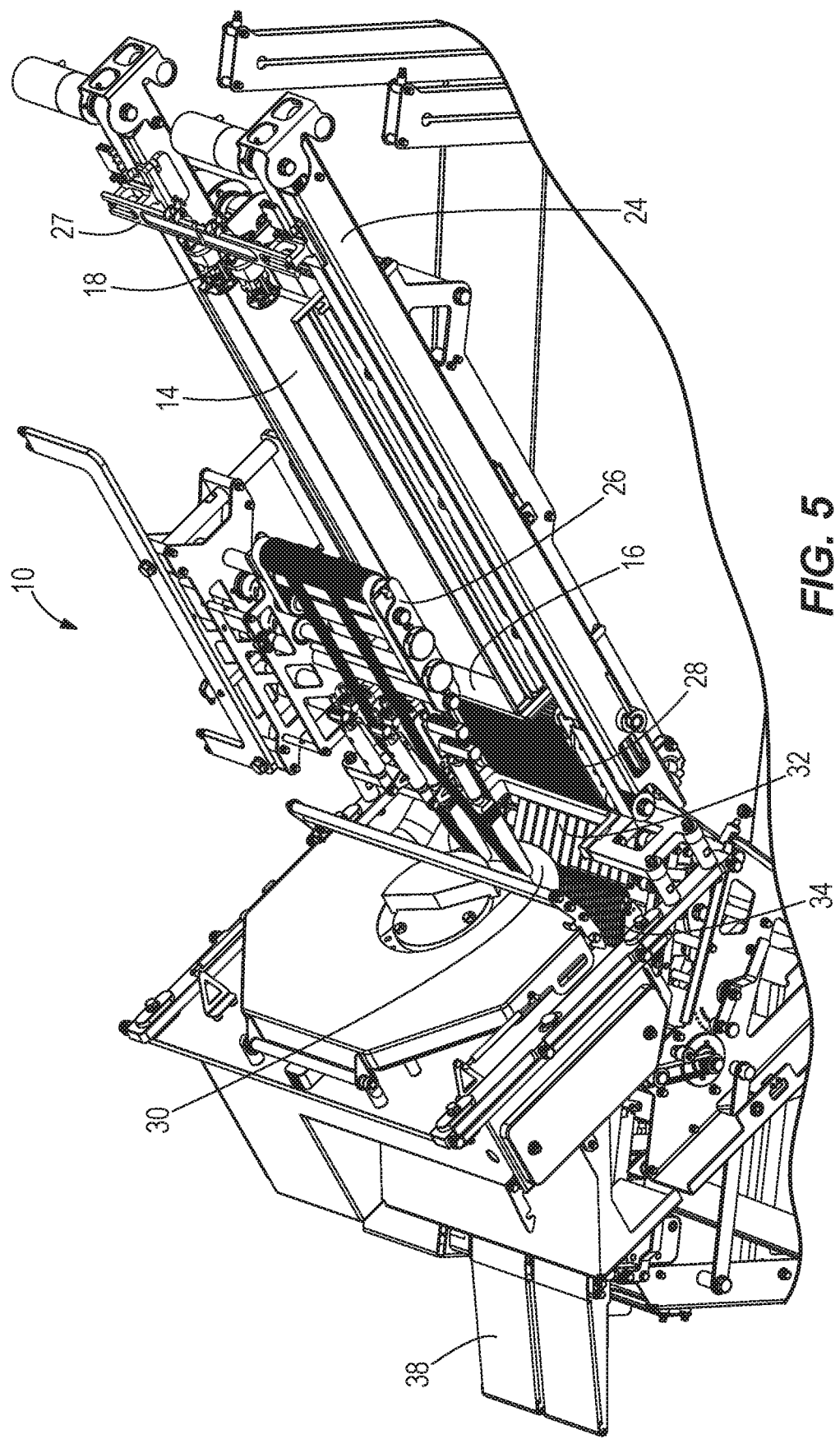
FIG. 5 illustrates a top partial perspective view of the food processing machine of the embodiment of FIG. 1 with the portion of the frame of the food processing machine of FIG. 1 removed and the food product removed to assist in viewing internal components.

FIG. 1 illustrates a side perspective view of one embodiment of a food processing machine 10 with a food product 12 disposed in a product tray 14 in a raised position, held in place by a gate 16, with a gripping device 18 disposed apart from the food product. FIG. 2 illustrates a side view of the food processing machine 10 of the embodiment of FIG. 1 with the food product 12 disposed in the product tray 14 in the raised position, held in place by the gate 16, with the gripping device 18 disposed apart from the food product 12. FIG. 3 illustrates a side view of the food processing machine 10 of the embodiment of FIG. 1 with the food product 12 disposed in the product tray 14 in the raised position, with the gate 16 having been lowered away from the food product 12, with the gripping device 18 disposed against an end of the food product 12 holding the food product 12 in place. FIG. 4 illustrates a partial side perspective view of the food processing machine 10 of the embodiment of FIG. 1 with a portion 19 of a frame 20 of the food processing machine 10 of FIG. 1 removed and the food product 12 removed to assist in viewing internal components. FIG. 5 illustrates a top partial perspective view of the food processing machine 10 of the embodiment of FIG. 1 with the portion 19 of the frame 20 of the food processing machine 10 of FIG. 1 removed and the food product 12 removed to assist in viewing internal components.

As shown collectively in FIGS. 1-5, the food processing machine 10 comprises the product tray 14, the gate 16, the gripping device 18, the frame 20, a control system 22, a product tray lift 24, a belt 25, an upper infeed 26, a bracket 27, a lower infeed 28, a slicing device 30, a slicing conveyor 32, a transfer conveyor 34, an exposed load cell device 36, and a classifier device 38.

The control system 22, comprising at least one processor with at least one memory comprising programming instructions for execution by the at least one processor, is adapted to control the entire food processing machine 10 including all of its components identified herein. As such, all movements or actions of any components of the food processing machine 10 described herein are controlled by the control system 22. The product tray lift 24 is adapted to rotate around pivot point 40 in counter-clockwise and clockwise directions 42 and 44 in order to respectfully raise and lower the product tray 14. Initially, the food product 12 is loaded in the product tray 14 while the product tray lift 24 has the product tray 14 disposed in a horizontal position (not shown) with the gate 16 holding the food product 12 in the product tray 14. After the food product 12 is loaded in the product tray 14, the product tray lift 24 is rotated in counter-clockwise direction 42 around pivot point 40 to dispose the product tray 14, the gate 16, and the food product 12 held within the product tray 14 by the gate 16 in the position of FIG. 2.

Next, the gripping device 18 is moved from its raised position apart from the food product 12 as shown in FIG. 2 in direction 46 to a lowered position against an end of the food product 12 as shown in FIG. 3. The gripping device 18 is moved from its raised position to its lowered position against the end of the food product 12 by rotating a belt 25 in a counter-clockwise direction 42, which in turn moves a bracket 27 attached to the belt 25 to the lowered position, which in turn moves the gripping device 18 attached to the bracket 27 to the lowered position. After the gripping device 18 contacts the end of the food product 12, the gripping device 18 closes to grip an end of the food product 12. Subsequently, the gate 16 is moved away from its position against the food product 12 as shown in FIG. 2 to its lowered position as shown in FIG. 3 so that the gate 16 no longer blocks the food product 12 from moving out of the product tray 14.

Next, the upper infeed 26 is rotated clockwise 44 and the lower infeed 28 is rotated counter-clockwise 42 while the gripping device 18 is moved further in direction 46, by rotating the belt 25 in the counter-clockwise direction 42 to move the attached bracket 27 and the attached gripping device 18, to gradually move the food product 12 into the slicing device 30. The slicing device 30 slices the food product 12 which then falls onto the slicing conveyor 32 which is located directly underneath the slicing device 30. The slicing conveyor 32 rotates counter-clockwise 42 to move the sliced food product 12 to and onto the transfer conveyor 34 which is disposed next to the slicing conveyor 32. The transfer conveyor 34 rotates counter-clockwise to move the sliced food product 12 to and onto an exposed load cell conveyor 48 of the exposed load cell device 36 which is next to the transfer conveyor 34.

The exposed load cell 50 of the exposed load cell device 36 weighs the sliced food product 12, and then the exposed load cell conveyor 48 of the exposed load cell device 36 moves the weighed and sliced food product 12 to and onto a classifier device 38 which is disposed next to the exposed load cell device 36. The exposed load cell 50 of the exposed load cell device 36 is permanently exposed (i.e. not contained within a protective housing) providing accessible cleaning so that the exposed load cell 50 can be easily washed with a liquid, such as by spraying the exposed load cell 50 with a nozzle, in order to clean the exposed load cell 50 without having to remove the exposed load cell 50 from a protective housing. This provides ease of access to the exposed load cell 50 which reduces the time and cost of cleaning and maintenance.

The classifier device 38 classifies the weighed and sliced food product 12 by determining whether the weighed and sliced food product 12 meets an acceptable criteria in part based on the determined weight of the weighed and sliced food product 12, as determined by the exposed load cell device 36. The weighed and sliced food product 12 which is determined by the classifier device 38 to meet the acceptable criteria is then packaged. The weighed and sliced food product 12 which is determined by the classifier device to not meet the acceptable criteria is then discarded or used for other purposes.

Figure 6:
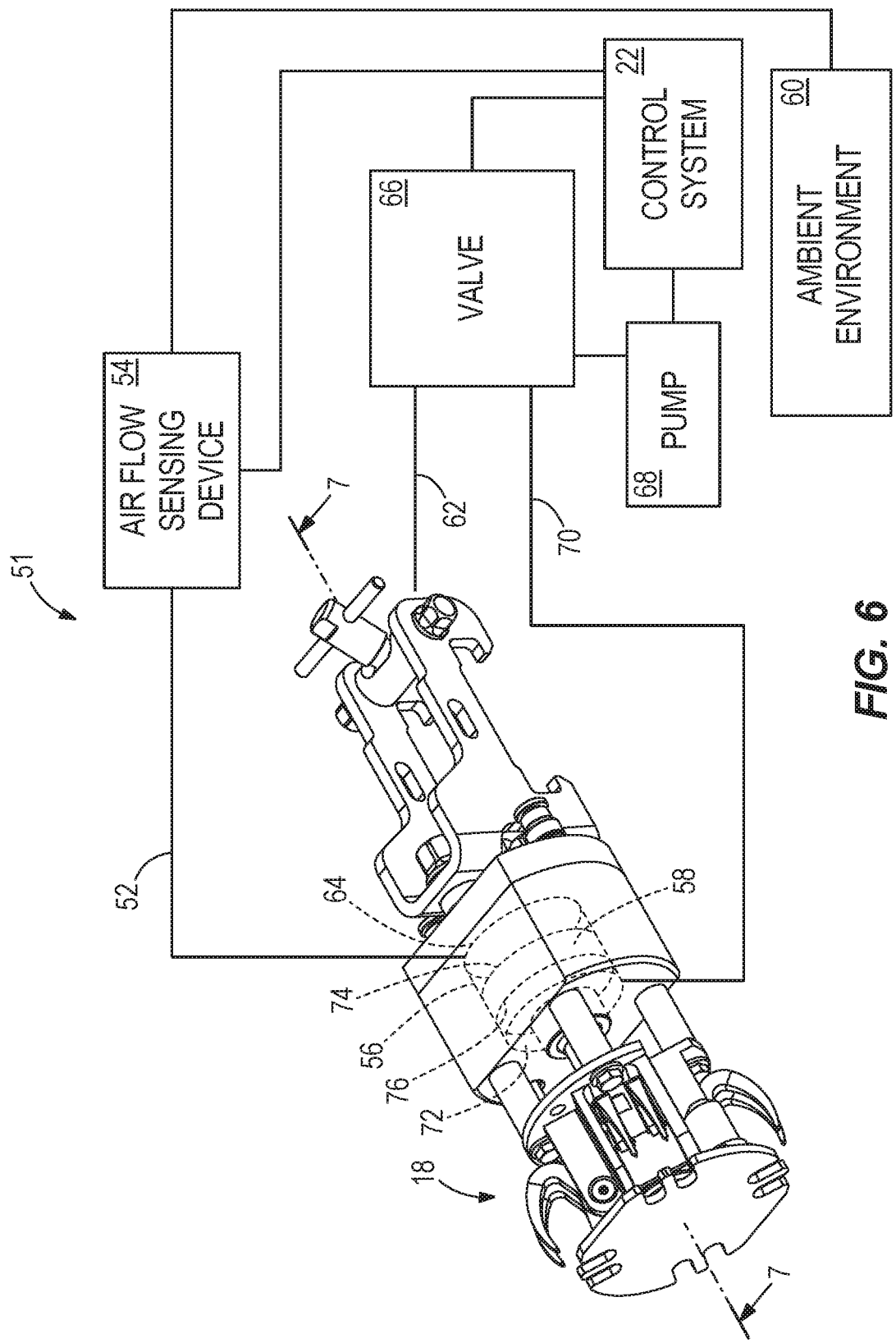
FIG. 6 illustrates a top perspective view of a gripping system comprising a gripping device, of the food processing machine of the embodiment of FIGS. 1-5, connected to an airflow sensing line, an airflow sensing device, an ambient environment, a first line, a valve, a pump, a second line, and a control system.

FIG. 6 illustrates a top perspective view of a gripping system 51 comprising a gripping device 18, of the food processing machine 10 of the embodiment of FIGS. 1-5, connected to an airflow sensing line 52, an airflow sensing device 54, an ambient environment 60, a first line 62, a valve 66, a pump 68, a second line 70, and the control system 22. It is noted that there are two gripping devices 18 in the food processing machine 10 of the embodiment of FIGS. 1-5 but only one is discussed since both function identically. In other embodiments, the food processing machine 10 of the embodiment of FIGS. 1-5 may have any number of gripping devices 18. As shown in FIG. 6, the airflow sensing line 52 containing the airflow sensing device 54 is connected to a compartment 56 of the gripping device 18. The compartment 56 contains a piston 58. The airflow sensing line 52 vents the compartment 56 to the ambient environment 60 at a location which is at least five feet away from the gripping device 18.

In one embodiment, the ambient environment 60 at the location which is at least five feet away from the gripping device 18 comprises the interior of a cabinet of the food processing system 10. The cabinet may comprise a portion of the food processing system 10, or may be separate from the food processing system 10. In one embodiment, the cabinet may be disposed at a bottom of the food processing system 10 at least five feet away from the gripping device 18. In other embodiments, the ambient environment 60 at the location which is at least five feet away from the gripping device 18 may vary in type and distance away from the gripping device 18.

By venting the air within the compartment 56 of the gripping device 18 to the ambient environment 60 at the location which is at least five feet away from the gripping device 18, it has unexpectedly been determined that the potential of the air within the compartment 56 of the gripping device 18 contaminating the food product 12 is substantially reduced or eliminated. In still other embodiments, the ambient environment 60 to which the air in the compartment 56 is vented to is located at a distance away from the gripping device 18 which reduces the likelihood of air in the compartment 56 contaminating food product 12 being handled by the food processing machine 10 by at least 90% or eliminates the contamination of the food product 12 by 100%. It has unexpectedly been determined that venting the air in the compartment 56 to an ambient environment 60 at a location which is at least five feet away from the gripping device 18 reduces the likelihood of air in the compartment 56 contaminating food product 12 being handled by the food processing machine 10 by at least 90% or eliminates the contamination of the food product 12 by 100%.

The first line 62 connects side 64 of the compartment 56 of the gripping device 18 to the valve 66 and to the pump 68. The second line 70 connects side 72 of the compartment 56 of the gripping device 18 to the valve 66 and to the pump 68. The first and second lines 62 and 70 terminate through their respective ports on opposite sides 74 and 76 of the piston 58. The airflow sensing line 52 is connected to side 64 of the compartment 56. Collectively, the airflow sensing line 52 and the first and second lines 62 and 70 comprise a plurality of lines 52, 62, and 70 connected to the compartment 56. At least two 62 and 70 lines of the plurality of lines 52, 62, and 70 connect the pump 68 to the compartment 56, with the valve 66 connected to the at least two 62 and 70 lines of the plurality of lines 52, 62, and 70. At least one 52 of the plurality of lines 52, 62, and 70 vents the compartment 56 to an ambient environment 60 at a location which is at least five feet away from the gripping device 18. The control system 22, comprising at least one processor with at least one memory comprising programming instructions for execution by the at least one processor, is electronically connected to the airflow sensing device 54, the valve 66, and the pump 68 for control and communication.

Figure 7:
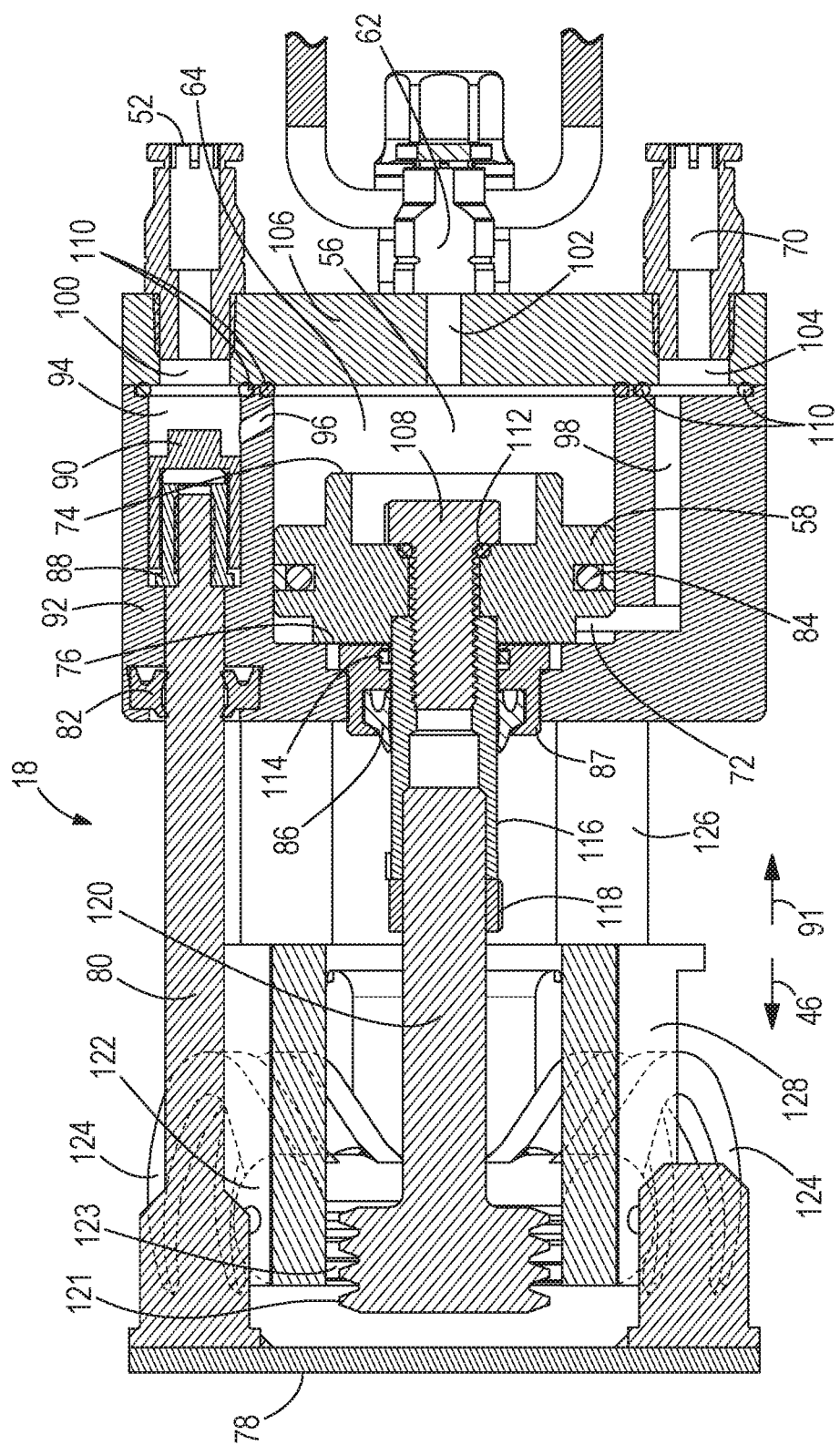
FIG. 7 illustrates a cross-sectional view through line 7-7 of the gripping device of the embodiment of FIG. 6 with a plate of the gripping device in an extended position, and grippers of the gripping device in an open configuration.

FIG. 7 illustrates a cross-sectional view through line 7-7 of the gripping device 18 of the embodiment of FIG. 6 with a plate 78 of the gripping device 18 in an extended position, and grippers 124 of the gripping device 18 in an open configuration. As illustrated in FIG. 7, the gripping device 18 comprises a plate 78, a rod 80, wipers 82 and 86, seal 84, bushing 87, connection member 88, disruption member 90, front housing 92, ports 94, 96, 98, 100, 102, and 104, back housing 106, compartment 56, piston 58, screw 108, seals 110, 112, and 114, piston back clamp 116, nut 118, rack gear 120, shaft gripper 122, grippers 124, and cylinders 126 and 128.

The plate 78 is fixedly attached to the rod 80. The connection member 88 is fixedly attached to and between the rod 80 and the disruption member 90. The rod 80 is configured to have relative movement in directions 46 and 91 relative to and within the port 94 of the front housing 92. Wiper 82 is disposed against and between the front housing 92 and the rod 80. The front housing 92 is attached to the back housing 106 with seal 110. The airflow sensing line 52 is connected to port 100 of the back housing 106. Port 100 of the back housing 106 is connected to port 94 of the front housing 92. Port 94 of the front housing 92 is connected through port 96 of the front housing 92 to side 64 of the compartment 56 of the front housing 92. First line 62 is connected to port 102 of the back housing 106. Port 102 of the back housing 106 is connected to side 64 of the compartment 56 of the front housing 92. Second line 70 is connected to port 104 of the back housing 106. Port 104 of the back housing 106 is connected to port 98 of the front housing 92. Port 98 of the front housing 92 is connected to side 72 of the compartment 56 of the front housing 92. The first and second lines 62 and 70 terminate through their respective ports on opposite sides 74 and 76 of the piston 58.

The piston 58 is moveably disposed back and forth in directions 46 and 91 within the compartment 56 of the front housing 92. Seal 84 is disposed between the piston 58 and the compartment 56 to seal the piston 58 to the compartment 56. Screw 108 is fixedly attached to piston 58 to move back and forth in directions 46 and 91 relative to the front housing 92 and the bushing 87. Seal 112 is disposed between screw 108 and piston 58 to seal the screw 108 to the piston 58. Screw 108 is fixedly attached to piston back clamp 116 so that piston back clamp 116 is moveably disposed back and forth in directions 46 and 91 relative to the front housing 92 and the bushing 87. Seal 114 is disposed between and against the piston back clamp 116 and the bushing 87. Bushing 87 is fixedly attached to the front housing 92. Wiper 86 is disposed between and against bushing 87 and piston back clamp 116.

Piston back clamp 116 is fixedly attached to the rack gear 120 with the nut 118 so that the rack gear 120 moves back and forth in directions 46 and 91 relative to the front housing 92. Cylinder 126 is fixedly attached to the front housing 92. Cylinder 128 is fixedly attached to cylinder 126. Piston back clamp 116 is disposed within cylinder 126. Rack gear 120 is disposed within cylinders 126 and 128. Teeth 121 of the rack gear 120 are interlocked with mating teeth 123 of the shaft gripper 122 so that when the rack gear 120 moves in direction 46 the grippers 124 attached to the shaft gripper 122 rotate to an open configuration as shown in FIGS. 7-10, and so that when the rack gear 120 moves in direction 91 the grippers 124 attached to the shaft gripper 122 rotate to a closed configuration as shown in FIG. 11.

Figure 8:
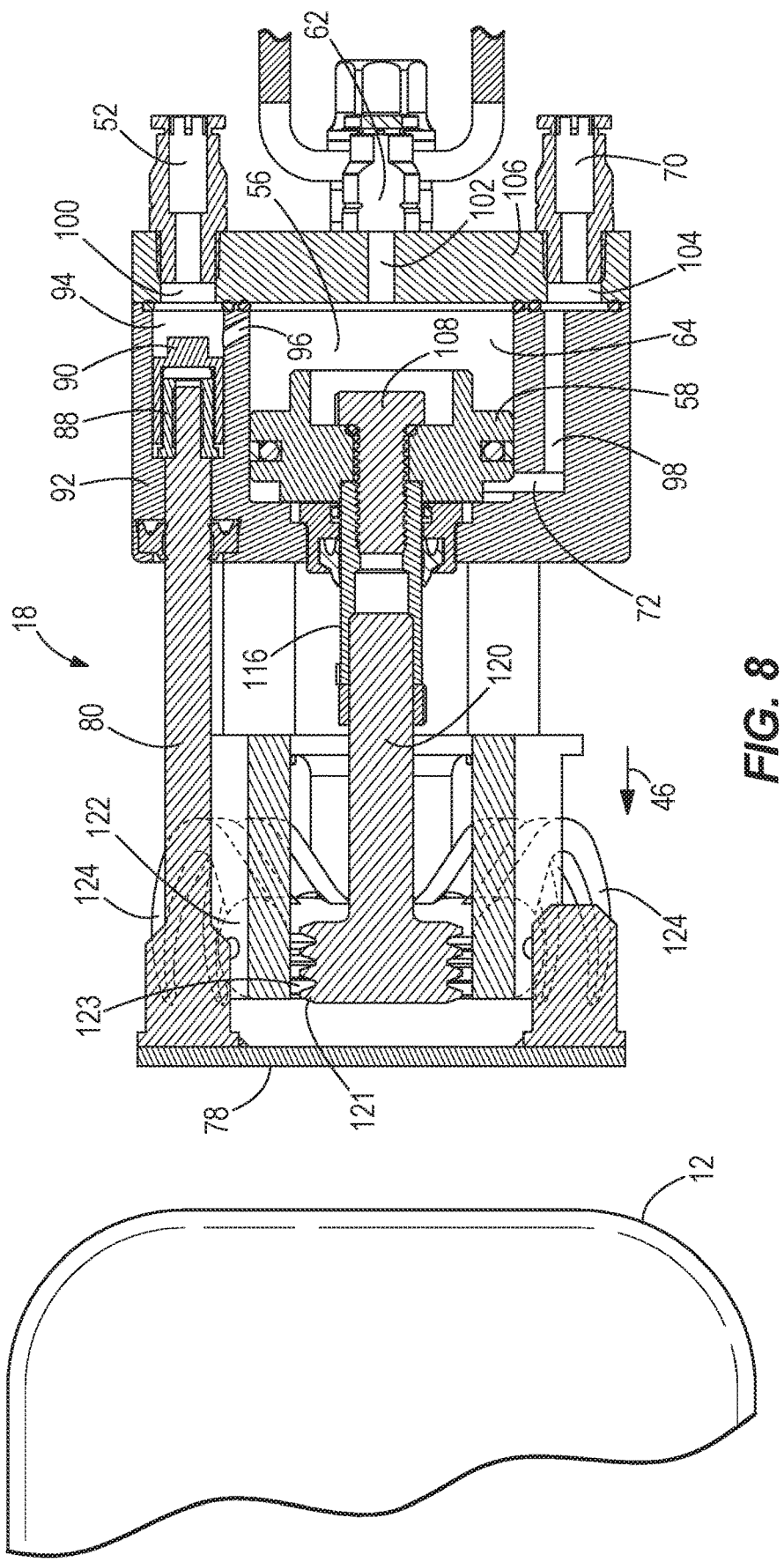
FIG. 8 illustrates the cross-sectional view of the gripping device of the embodiment of FIG. 7 with the plate of the gripping device in an extended position disposed apart from the food product, and the grippers of the gripping device disposed in the open configuration apart from the food product.

FIG. 8 illustrates the cross-sectional view of the gripping device 18 of the embodiment of FIG. 7 with the plate 78 of the gripping device 18 in an extended position disposed apart from the food product 12, and the grippers 124 of the gripping device 18 disposed in an open configuration apart from the food product 12. The gripping device 18 is being moved in direction 46 towards the food product 12 as a result of the front housing 92 being attached to the bracket 27 (FIG. 1) attached to the belt 25 (FIG. 1) which is moving in counter-clockwise direction 42 (FIG. 1). Since the plate 78 is in the extended position, the attached rod 80, connecting member 88, and disruption member 90 are also in an extended position within the port 94 of the front housing 92, with the disruption member 90 being disposed apart from port 96 of the front housing 92 and apart from port 100 of the back housing 106 so as not to cause a change in the airflow flowing into the airflow sensing line 52.

The control system 22 (FIG. 1) knows that there has not been a change in the airflow because the electronically-connected airflow sensing device 54 (FIG. 6) connected to the airflow sensing line 52 senses that there has not been a change in the airflow being pumped by the pump 68 (FIG. 6) through the first line 62, through the port 102 of the back housing 106, into side 64 of the compartment 56 of the front housing 92, through port 96 of the front housing 92, through port 94 of the front housing 92, through port 100 of the back housing 106, through the airflow sensing line 52, past the airflow sensing device 54 (FIG. 6), and vented to the ambient environment 60 (FIG. 6) at the location which is at least five feet away from the gripping device 18.

At this time the control system 22 (FIG. 6) controls the valve 66 (FIG. 6) so that the pump 68 (FIG. 6) pumps the air through the first line 62, through port 102 of the back housing 106, into side 64 of the compartment 56 of the front housing 92 forcing the piston 58 in direction 46 so that the piston 58 abuts against side 72 of the compartment 56 of the front housing 92. Simultaneously, the control system 22 (FIG. 6) controls the valve 66 (FIG. 6) so that air on side 72 of the compartment 56 is being vented from side 72 of the compartment 56, through port 98 of the front housing 92, through port 104 of the back housing 106, through the second line 70, through the valve 66 (FIG. 6), to the pump 68 (FIG. 6).

The grippers 124 of the gripping device 18 remain in the open configuration apart from the food product 12 because the piston 58 has been moved in direction 46 to be disposed against side 72 of the compartment 56 causing the attached screw 108, back clamp 116, and rack gear 120 to also be moved in direction 46, thereby forcing the grippers 124 into the open configuration due to the movement of the interlocking of the mating teeth 123 of the attached shaft gripper 122 with the teeth 121 of the rack gear 120.

Figure 9:
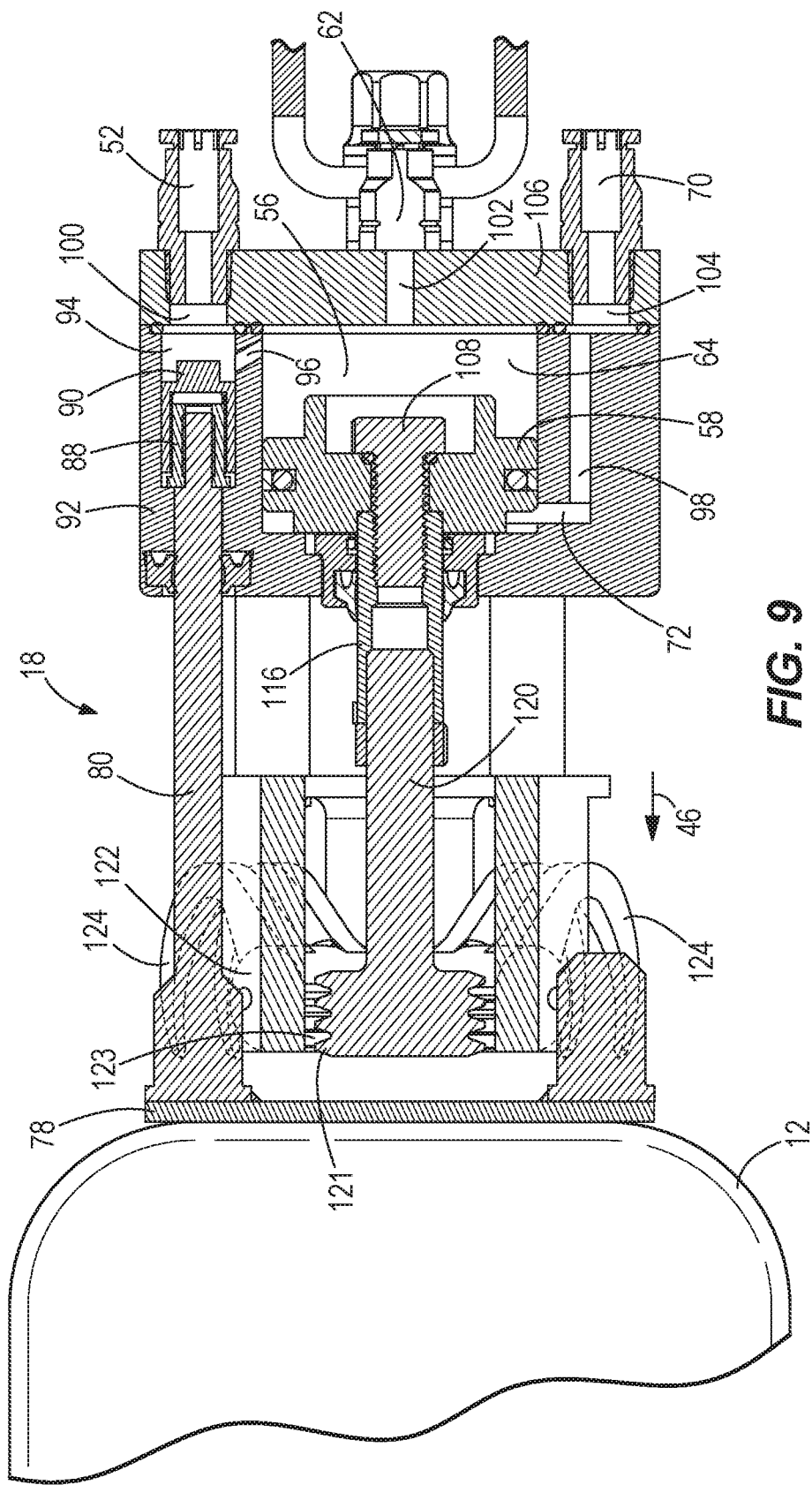
FIG. 9 illustrates the cross-sectional view of the gripping device of the embodiment of FIG. 8 with the plate of the gripping device remaining in the extended position as it first contacts the food product, and the grippers of the gripping device remaining in the open configuration apart from the food product.

FIG. 9 illustrates the cross-sectional view of the gripping device 18 of the embodiment of FIG. 8 with the plate 78 of the gripping device 18 remaining in the extended position as it first contacts the food product 12, and grippers 124 of the gripping device 18 remaining in the open configuration apart from the food product 12. The front housing 92 of the gripping device 18 is still being moved in direction 46 towards the food product 12 as a result of the front housing 92 attachment to the bracket 27 (FIG. 1) attached to the belt 25 (FIG. 1) which continues to move in counter-clockwise direction 42 (FIG. 1). However, the plate 78 and the attached rod 80, connecting member 88, and disruption member 90 stop moving as a result of the plate being abutted against the stationary food product 12 (which is constrained by the gate 16 as shown in FIG. 1). Since the plate 78 is in the extended position, the attached rod 80, connecting member 88, and disruption member 90 are also in an extended position within the port 94 of the front housing 92, with the disruption member 90 being disposed apart from port 96 of the front housing 92 and apart from port 100 of the back housing 106 so as not to cause a change in the airflow flowing into the airflow sensing line 52.

The control system 22 (FIG. 6) knows that there has not been a change in the airflow because the electronically-connected airflow sensing device 54 (FIG. 6) connected to the airflow sensing line 52 senses that there has not been a change in the airflow being pumped by the pump 68 (FIG. 6) through the first line 62, through the port 102 of the back housing 106, into side 64 of the compartment 56 of the front housing 92, through port 96 of the front housing 92, through port 94 of the front housing 92, through port 100 of the back housing 106, through the airflow sensing line 52, past the airflow sensing device 54 (FIG. 6), and vented to the ambient environment 60 (FIG. 6) at the location which is at least five feet away from the gripping device 18.

At this time the control system 22 (FIG. 6) controls the valve 66 (FIG. 6) so that the pump 68 (FIG. 6) pumps the air through the first line 62, through port 102, into side 64 of the compartment 56 of the front housing 92 forcing the piston 58 in direction 46 so that the piston 58 abuts against side 72 of the compartment 56 of the front housing 92. Simultaneously, the control system 22 (FIG. 6) controls the valve 66 (FIG. 6) so that air on side 72 of the compartment 56 is being vented from side 72 of the compartment 56, through port 98 of the front housing 92, through port 104 of the back housing 106, through the second line 70, through the valve 66 (FIG. 6), to the pump 68 (FIG. 6).

The grippers 124 of the gripping device 18 remain in the open configuration apart from the food product 12 because the piston 58 continues to be disposed against side 72 of the compartment 56 causing the attached screw 108, back clamp 116, and rack gear 120 to also remain in their position, thereby continuing to keep the grippers 124 in their open configuration due to the interlocking of the mating teeth 123 of the attached shaft gripper 122 with the teeth 121 of the rack gear 120.

Figure 10:
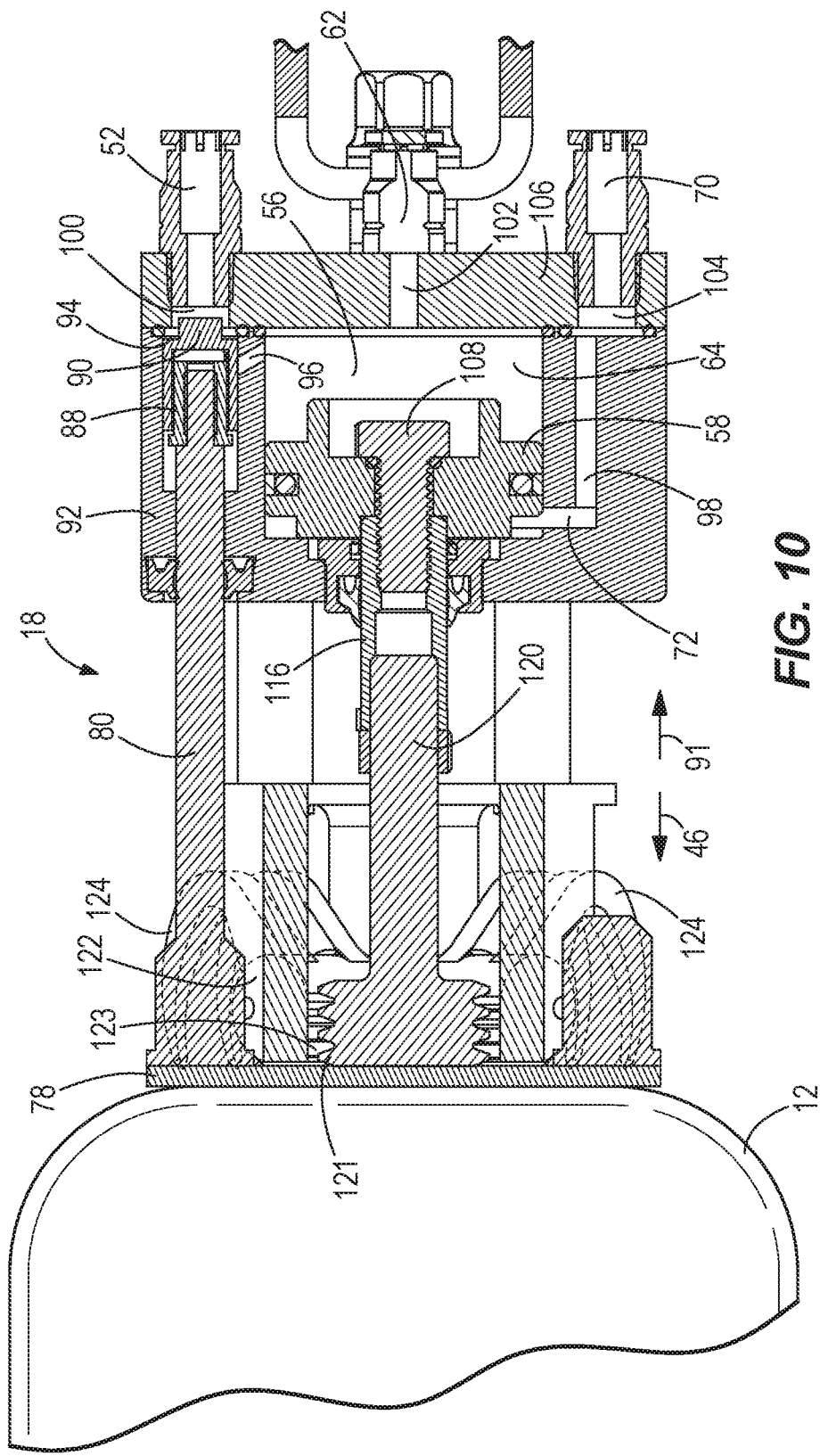
FIG. 10 illustrates the cross-sectional view of the gripping device of the embodiment of FIG. 9 with the plate of the gripping device being disposed in a compressed position, and the grippers of the gripping device remaining in the open configuration apart from the food product.
Figure 11:
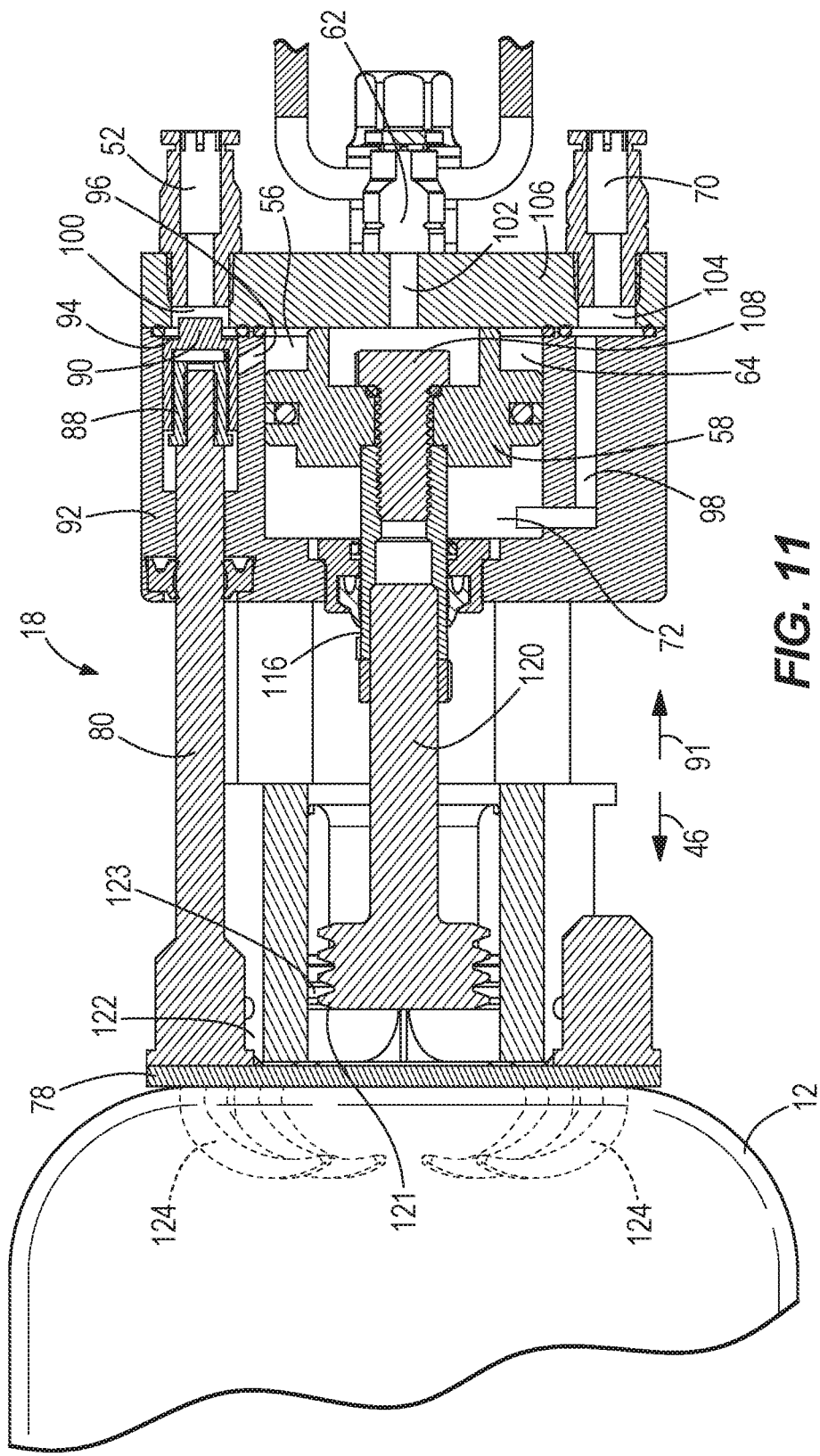
FIG. 11 illustrates the cross-sectional view of the gripping device of the embodiment of FIG. 10 with the plate of the gripping device remaining in its compressed position, and the grippers of the gripping device having moved to their closed configuration gripping the food product.

FIG. 10 illustrates the cross-sectional view of the gripping device 18 of the embodiment of FIG. 9 with the plate 78 of the gripping device 18 being disposed in a compressed position, and the grippers 124 of the gripping device 18 remaining in the open configuration apart from the food product 12. The plate 78 of the gripping device 18 is now in the compressed position due to the stationary food product 12 (constrained by the gate 16 as shown in FIG. 1) having forced the plate 78 to remain stationary as the front housing 92 and the attached bracket 27 (FIG. 1) continue to move in direction 46 as the attached belt 25 (FIG. 1) continues to move in counter-clockwise direction 42 (FIG. 1) thereby moving the front housing 92 towards the plate 78. Since the plate 78 is now in the compressed position, the attached rod 80, connecting member 88, and disruption member 90 are also now in their compressed position within the port 94 of the front housing 92, with the disruption member 90 being disposed against and blocking port 96 of the front housing 92 and being disposed against and blocking port 100 of the back housing 106 thereby causing a change in the airflow flowing into the airflow sensing line 52.

The control system 22 (FIG. 6) knows that there has been a change in the airflow because the electronically-connected airflow sensing device 54 (FIG. 6) connected to the airflow sensing line 52 senses that there has been a change in the airflow being pumped by the pump 68 (FIG. 6) through the first line 62, through the port 102 of the back housing 106, into side 64 of the compartment 56 of the front housing 92, through port 96 of the front housing 92, through port 94 of the front housing 92 (which is now blocked by the disruption member 90), through port 100 of the back housing 106 (which is now blocked by the disruption member 90), through the airflow sensing line 52, past the airflow sensing device 54 (FIG. 6), and vented to the ambient environment 60 (FIG. 6) at the location which is at least five feet away from the gripping device 18.

At this time the control system 22 (FIG. 6), as a result of the sensing of the change in the airflow, switches the valve 66 (FIG. 6) so that the pump 68 (FIG. 6) begins to pump the air through the second line 70, through port 104, through port 98, into side 72 of the compartment 56 of the front housing 92 so that the air begins to move the piston 58 in direction 91 away from side 72 of the compartment 56 of the front housing 92. Simultaneously, as a result of the switching of the valve 66 (FIG. 6) by the control system 22 (FIG. 6) air on side 64 of the compartment 56 begins to be vented from side 64 of the compartment 56, through port 102, through the first line 62, through the valve 66 (FIG. 6), to the pump 68 (FIG. 6).

The grippers 124 of the gripping device 18 remain in their open configuration disposed apart from the food product 12 but begin to move towards their closed configuration disposed against the food product 12 because the piston 58 begins to move in direction 91 away from side 72 of the compartment 56 causing the attached screw 108, back clamp 116, and rack gear 120 to also begin to be moved in direction 91, thereby beginning to move the grippers 124 towards their closed configuration due to the movement of the interlocking of the mating teeth 123 of the attached shaft gripper 122 with the teeth 121 of the rack gear 120.

FIG. 11 illustrates the cross-sectional view of the gripping device 18 of the embodiment of FIG. 10 with the plate 78 of the gripping device 18 remaining in its compressed position, and the grippers 124 of the gripping device 18 having moved to their closed configuration gripping the food product 12. The plate 78 of the gripping device 18 has remained in its compressed position due to the stationary food product 12 (constrained by the gate 16 as shown in FIG. 1) having continued to force the plate 78 to remain stationary as the front housing 92 and the attached bracket 27 (FIG. 1) continue to move in direction 46 as the attached belt 25 (FIG. 1) continues to move in counter-clockwise direction 42 (FIG. 1) thereby keeping the plate 78 compressed relative to the front housing 92. Since the plate 78 has remained in its compressed position, the attached rod 80, connecting member 88, and disruption member 90 have also remained in their compressed position within the port 94 of the front housing 92, with the disruption member 90 continuing to be disposed against and blocking port 96 of the front housing 92 and continuing to be disposed against and blocking port 100 of the back housing 106 thereby continuing to cause a change in the airflow flowing into the airflow sensing line 52.

The control system 22 (FIG. 6) continues to know that there has been a change in the airflow because the electronically-connected airflow sensing device 54 (FIG. 6) connected to the airflow sensing line 52 continues to sense that there has been a change in the airflow being pumped by the pump 68 (FIG. 6) through the first line 62, through the port 102 of the back housing 106, into side 64 of the compartment 56 of the front housing 92, through port 96 of the front housing 92, through port 94 of the front housing 92 (which continues to be blocked by the disruption member 90), through port 100 of the back housing 106 (which continues to be blocked by the disruption member 90), through the airflow sensing line 52, past the airflow sensing device 54 (FIG. 6), and vented to the ambient environment 60 (FIG. 6) at the location which is at least five feet away from the gripping device 18.

At this time the control system 22 (FIG. 6), as a result of the continued sensing of the change in the airflow, has retained the switch of the valve 66 (FIG. 6) so that the pump 68 (FIG. 6) has continued to pump the air through the second line 70, through port 104, through port 98, into side 72 of the compartment 56 of the front housing 92 so that the air has moved the piston 58 in direction 91 away from side 72 and against side 64 of the compartment 56 of the front housing 92. Simultaneously, as a result of the retained switch of the valve 66 (FIG. 6) by the control system 22 (FIG. 6) air on side 64 of the compartment 56 continues to be vented from side 64 of the compartment 56, through port 102, through the first line 62, through the valve 66 (FIG. 6), to the pump 68 (FIG. 6).

The grippers 124 of the gripping device 18 have moved to their closed configuration gripping the food product 12 because the piston 58 has moved in direction 91 against side 64 of the compartment 56 causing the attached screw 108, back clamp 116, and rack gear 120 to also have moved in direction 91, thereby having caused the grippers 124 to move into their closed configuration gripping the food product 12 due to the movement of the interlocking of the mating teeth 123 of the attached shaft gripper 122 with the teeth 121 of the rack gear 120.

As shown in FIG. 3, after the grippers 124 of the gripping device 18 grip the food product 12, the control system 22 lowers the gate 16 away from the food product 12 so that the gate 16 no longer holds the food product 12 in place within the product tray 14, with the gripping device 18 disposed against an end of the food product 12 holding the food product 12 in place. Next, the upper infeed 26 is rotated clockwise 44 and the lower infeed 28 is rotated counter-clockwise 42 while the gripping device 18 is moved further in direction 46, by rotating the belt 25 in the counter-clockwise direction 42 to move the attached bracket 27 and the attached gripping device 18, to gradually move the food product 12 into the slicing device 30 (FIG. 4). The slicing device 30 (FIG. 4) slices the food product 12 which then falls onto the slicing conveyor 32 (FIG. 4) which is located directly underneath the slicing device 30 (FIG. 4). After the food product 12 is completely sliced, the belt 25 is rotated in the clockwise direction 44 thereby causing the attached bracket 27 and the attached gripping device 18 to be raised in back to their raised position shown in FIG. 2.

At this time, as shown in FIG. 7, the control system 22 (FIG. 6) switches the valve 66 (FIG. 6) so that the pump 68 (FIG. 6) pumps the air through the first line 62, through port 102 of the back housing 106, into side 64 of the compartment 56 of the front housing 92 forcing the piston 58 in direction 46 so that the piston 58 abuts against side 72 of the compartment 56 of the front housing 92. The grippers 124 of the gripping device 18 move to their open configuration apart from the food product 12 because the piston 58 has been moved in direction 46 to be disposed against side 72 of the compartment 56 causing the attached screw 108, back clamp 116, and rack gear 120 to also be moved in direction 46, thereby forcing the grippers 124 into the open configuration due to the movement of the interlocking of the mating teeth 123 of the attached shaft gripper 122 with the teeth 121 of the rack gear 120.

Simultaneously, the air being pumped through the first line 62, through port 102 of the back housing 106, into side 64 of the compartment 56 of the front housing 92, through port 96 of the front housing 92, and into port 94 of the front housing 92 pushes the disruptive member 90, and the attached connecting member 88, attached rod 80, and attached plate 78 in direction 46 back to their extended position. Simultaneously, as a result of the valve 66 (FIG. 6) switch, air on side 72 of the compartment 56 is vented from side 72 of the compartment 56, through port 98 of the front housing 92, through port 104 of the back housing 106, through the second line 70, through the valve 66 (FIG. 6), to the pump 68 (FIG. 6).

Referring to FIG. 1, the product tray lift 24 is then lowered, by rotating it in clockwise direction 44 around pivot point 40, to its horizontal position (not shown) and more food product 12 is loaded into the product tray 14 with the gate 16 having been moved upward to hold the food product 12 in the product tray 14. After the food product 12 is loaded in the product tray 14, the product tray lift 24 is rotated in counter-clockwise direction 42 around pivot point 40 to dispose the product tray 14, the gate 16, and the food product 12 held within the product tray 14 by the gate 16 back in the position shown in FIG. 1. The process described previously is then repeated to slice the food product 12, and the entire process is repeated as many times as necessary to slice additional food product 12.

Figure 12:
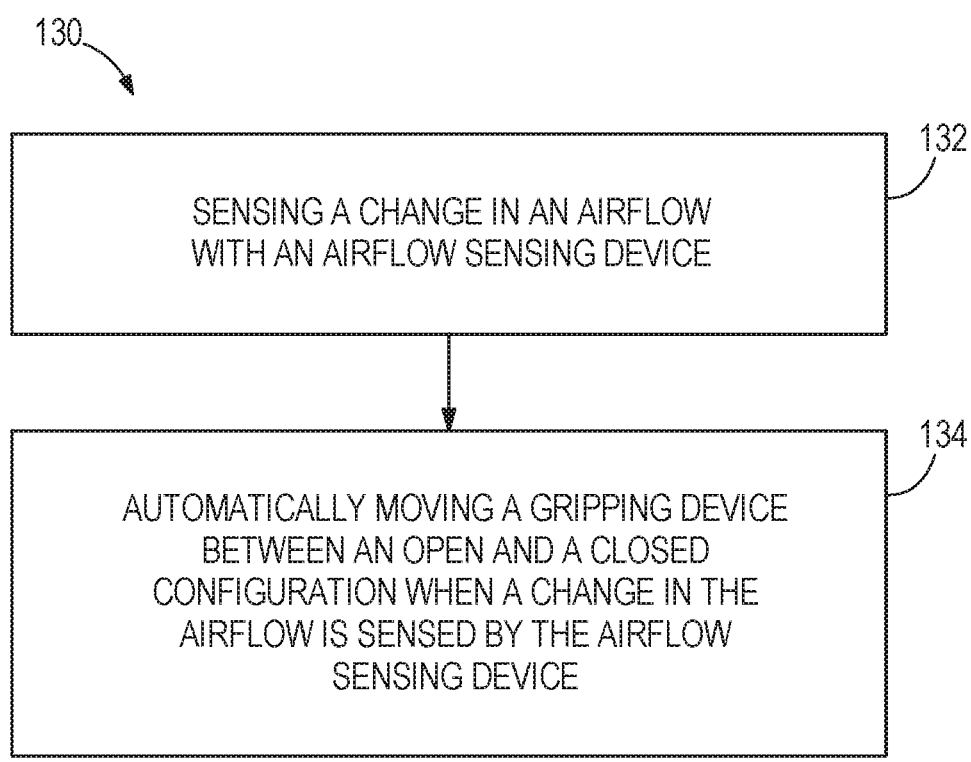
FIG. 12 illustrates is a flowchart of one embodiment of a method of operating a gripping device of a food processing machine.

FIG. 12 is a flowchart of one embodiment of a method 130 of operating a gripping device of a food processing machine. The method 130 may utilize any of the embodiments of the food processing machine disclosed herein. In other embodiments, the method 130 may utilize varying embodiments of the food processing machine. In step 132, a change in the airflow is sensed with an airflow sensing device. In one embodiment, step 132 further comprises venting air in a compartment to an ambient environment, through an airflow sensing line containing the airflow sensing device, at a location which is at least five feet away from the gripping device. In other embodiments, step 132 further comprises venting air in a compartment to an ambient environment, through an airflow sensing line containing the airflow sensing device, at a location which is located at a distance away from the gripping device which reduces the likelihood of air in the compartment contaminating food product being handled by the food processing machine by at least 90% or eliminates the contamination of the food product by 100%. It has unexpectedly been determined that venting the air in the compartment to an ambient environment at a location which is at least five feet away from the gripping device reduces the likelihood of air in the compartment contaminating food product being handled by the food processing machine by at least 90% or eliminates the contamination of the food product by 100%.

In step 134, the gripping device is automatically moved between an open and a closed configuration when a change in the airflow is sensed by the airflow sensing device. In one embodiment, step 134 further comprises a food product forcing a plate to move between an extended position and a compressed position to cause the change in the airflow sensed by the airflow sensing device. In another embodiment, step 134 further comprises automatically switching which of first and second lines delivers air into a compartment and which of the first and the second lines vents the air out of the compartment when the airflow sensing device senses the change in the airflow, with a piston within the compartment being moved by the air in one direction when the first line delivers the air into the compartment and the piston within the compartment being moved by the air in an opposite direction when the second line delivers the air into the compartment. In other embodiments, one or more steps of the method 130 may be varied in substance or in order, one or more steps of the method 130 may be eliminated, or one or more additional steps may be added to the method 130.

One or more embodiments of the disclosure overcomes one or more issues associated with one or more of the gripping systems of the existing food processing machines by determining when the gripping device is in contact with a food product when a port connected to an airflow sensing device is blocked thereby changing the airflow detected by the airflow sensing device. This is more reliable than other gripping systems leading to reduced down-time and maintenance cost. One or more embodiments of the disclosure further overcomes one or more issues associated with one or more of the gripping systems of the existing food processing machines by venting air in a compartment to an ambient environment which is located at a distance away which dramatically reduces the likelihood of the air being vented from the compartment contaminating the food product being gripped by the gripping device of the food processing machine.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A gripping system of a food processing machine comprising:
   a gripping device moveable between an open configuration and a closed configuration;
   an airflow sensing device which does not comprise an air pressure sensor;
   at least one processor in electronic communication with the airflow sensing device;
   at least one memory in electronic communication with the at least one processor, wherein the at least one memory comprises programming code for execution by the at least one processor, and the programming code is configured to move the gripping device from the open configuration to the closed configuration when the airflow sensing device senses a change in the airflow.

2. The gripping system of claim 1 further comprising a plate moveable between an extended position and a compressed position, wherein a disruption member connected with the plate disrupts the airflow communicating with an airflow sensing line connected to the airflow sensing device in different amounts when the plate is in the extended position versus when the plate is in the compressed position thereby creating the change in the airflow.

3. The gripping system of claim 1 further comprising a compartment connected to first and second lines, wherein the programming code is configured to switch which of the first and second lines delivers air into the compartment and which of the first and second lines vents the air out of the compartment when the airflow sensing device senses the change in the airflow.

4. The gripping system of claim 3 further comprising a pump and a valve, the pump, the valve, and the first and second lines all connected, wherein the programming code is configured to switch the valve to control which of the first and second lines delivers the air from the pump into the compartment and which of the first and second lines vents the air out of the compartment when the airflow sensing device senses the change in the airflow.

5. The gripping system of claim 1 further comprising a compartment connected to first and second lines and to an airflow sensing line, the airflow sensing line connected to the airflow sensing device, the compartment containing a piston for moving the gripping device between the open and closed configurations, the piston configured to move in one direction within the compartment when air flows into the compartment through the first line and configured to move in an opposite direction within the compartment when the air flows into the compartment through the second line, wherein the airflow sensing line vents to an ambient environment at a location which is at least five feet away from the gripping device.

6. The gripping system of claim 5 wherein the airflow sensing line vents to the ambient environment within a cabinet which is at least five feet away from the gripping device.

7. The gripping system of claim 2 further comprising a compartment connected to the airflow sensing line and to first and second lines, wherein the programming code is configured to switch which of the first and second lines delivers air into the compartment and which of the first and second lines vents the air out of the compartment when the airflow sensing device senses the change in the airflow communicating with the airflow sensing line.

8. The gripping system of claim 7 wherein the plate is configured to be moved from the compressed position to the extended position due to the air delivered into the compartment forcing the disruption member to move.

9. The gripping system of claim 8 further comprising a pump and a valve, the pump, the valve, and the first and second lines all connected, wherein the programming code is configured to switch the valve to control which of the first and second lines delivers the air from the pump into the compartment and which of the first and second lines vents the air out of the compartment when the airflow sensing device senses the change in the airflow.

10. The gripping system of claim 9 further comprising a piston contained in the compartment, the piston for moving the gripping device between the open and closed configurations, the piston configured to move in one direction within the compartment when the air flows into the compartment through the first line and configured to move in an opposite direction within the compartment when the air flows into the compartment through the second line, wherein the airflow sensing line vents to an ambient environment at a location which is at least five feet away from the gripping device.

11. The gripping system of claim 10 wherein the airflow sensing line vents to the ambient environment within a cabinet which is at least five feet away from the gripping device.

12. A gripping system of a food processing machine comprising:
a gripping device moveable between an open configuration and a closed configuration;
a compartment;
a piston disposed within the compartment for moving the gripping device between the open configuration and the closed configuration;
a pump; and
a plurality of lines, wherein at least two of the plurality of lines connect the pump to the compartment, and at least one of the plurality of lines vents the compartment to an ambient environment at a location which is at least five feet away from the gripping device.

13. The gripping system of claim 12 further comprising a valve connected to the at least two of the plurality of lines, at least one processor, and at least one memory in electronic communication with the at least one processor, wherein the at least one memory comprises programming code for execution by the at least one processor, the programming code configured to control the valve to alternatingly switch which of the at least two of the plurality of lines delivers air into the compartment and which of the at least two of the plurality of lines vents the air out of the compartment in order to move the gripping device between the open and closed configurations.

14. The gripping system of claim 13 wherein the at least two of the plurality of lines are connected to the compartment at locations which are on opposite sides of the piston.

15. The gripping system of claim 12 further comprising a cabinet, wherein the at least one of the plurality of lines vents air out of the compartment to the ambient environment within the cabinet which is at least five feet away from the gripping device.

16. A method of operating a gripping device of a food processing machine comprising:
sensing a change in airflow with an airflow sensing device that senses the change in airflow without sensing air pressure; and
automatically moving the gripping device between an open and a closed configuration when the change in the airflow is sensed by the airflow sensing device.

17. The method of claim 16 further comprising a food product forcing a plate to move between an extended position and a compressed position causing the change in the airflow.

18. The method of claim 17 further comprising automatically switching which of first and second lines delivers air into a compartment and which of the first and second lines vents the air out of the compartment when the airflow sensing device senses the change in the airflow.

19. The method of claim 18 wherein the automatically moving the gripping device between the open and the closed configuration further comprises when the first line delivers the air in the compartment the air forcing a piston within the compartment to move in one direction, and when the second line delivers the air in the compartment the air forcing the piston within the compartment to move in an opposite direction.

20. The gripping system of claim 1 further comprising an airflow sensing line connected to the airflow sensing device, the airflow sensing line vented to an ambient environment at a location at least five feet away from the gripping device.

21. The gripping system of claim 1 further comprising an airflow sensing line connected to the airflow sensing device, the airflow sensing line vented to an ambient environment within a cabinet.

22. The method of claim 16 further comprising venting air in a compartment to an ambient environment, through an airflow sensing line connected to an airflow sensing device, at a location which is at least five feet away from a gripping device.

23. The method of claim 16 further comprising venting air in a compartment to an ambient environment, through an airflow sensing line connected to an airflow sensing device, within a cabinet.

* * * * *